United States Patent
Ichikawa et al.

(10) Patent No.: US 8,140,810 B2
(45) Date of Patent: Mar. 20, 2012

(54) STORAGE MANAGEMENT COMMAND CONTROL IN VIRTUALIZED ENVIRONMENT

(75) Inventors: Naoko Ichikawa, San Jose, CA (US); Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 12/478,088

(22) Filed: Jun. 4, 2009

(65) Prior Publication Data
US 2010/0312982 A1    Dec. 9, 2010

(51) Int. Cl.
*G06F 12/00* (2006.01)
(52) U.S. Cl. .................. 711/170; 711/156; 711/202
(58) Field of Classification Search .................. None
See application file for complete search history.

(56) References Cited

U.S. PATENT DOCUMENTS

| 7,159,024 | B2 | 1/2007 | Mitsuoka et al. |
| 7,203,806 | B2 | 4/2007 | Kasako et al. |

*Primary Examiner* — Shawn X Gu
(74) *Attorney, Agent, or Firm* — Mattingly & Malur, P.C.

(57) ABSTRACT

Exemplary embodiments of the invention provide a method for creating a command device in a storage system in a server virtualization environment. The storage system is coupled to a host computer having a virtual machine. The host computer includes a memory and a processor. The method comprises receiving a command device registration request to register a command device as a storage device for command transmission, the command device to be used in a virtual machine of the host computer; creating a virtual device by allocating a storage area of the storage system to the virtual device; and mounting the virtual device as the command device to the virtual machine in which the command device is used.

20 Claims, 13 Drawing Sheets

Command Device Registration (Host Computer)

Command Device Management Table 154

| Command Device ID | Volume ID | Device Type |
|---|---|---|
| 1 | 01 | Physical Device |
| 2 | 02 | Virtual Device |
| 3 | 03, 04 | Virtual Device |

Fig. 3

Command Device Mapping Table 155

| Command Device ID | Volume ID | Disk Address |
|---|---|---|
| 2 | 02 | 0x00 |
| | | 0x10 |
| | | 0x11 |
| | | 0x12 |
| | | 0xA0 |
| 3 | 03 | 0x1F |
| | | 0x20 |
| | 04 | 0x01 |
| | | 0x02 |
| 1551 | 1552 | 1553 |

Fig. 4

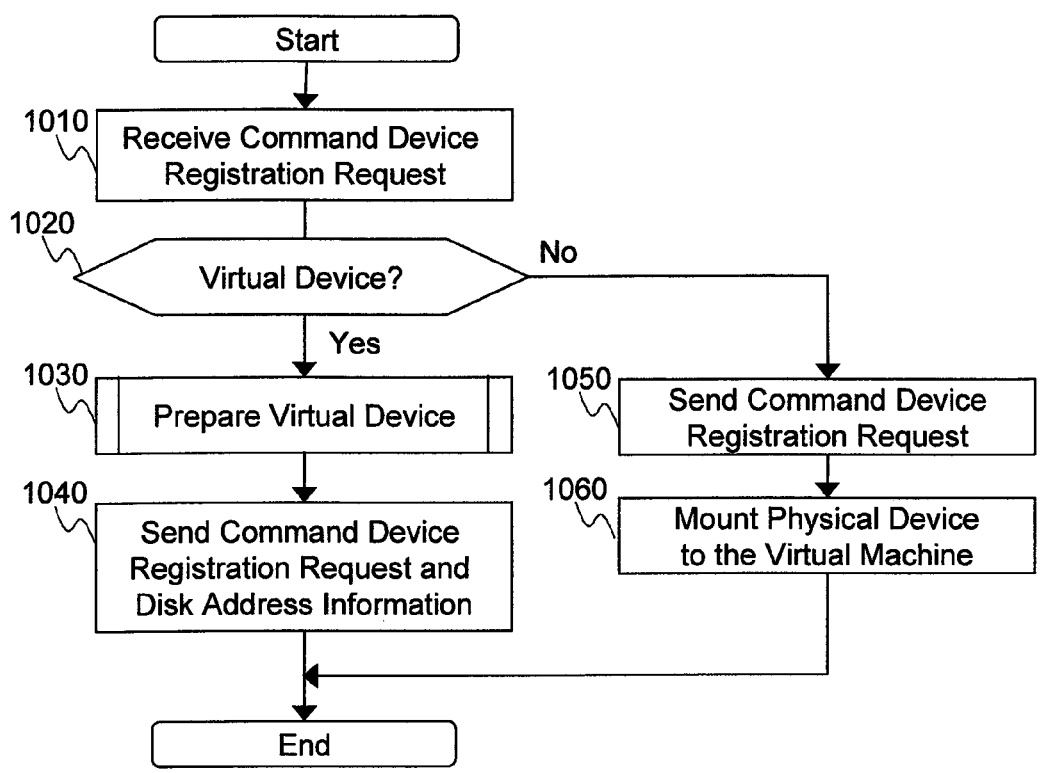
Fig. 7 Command Device Registration (Host Computer)

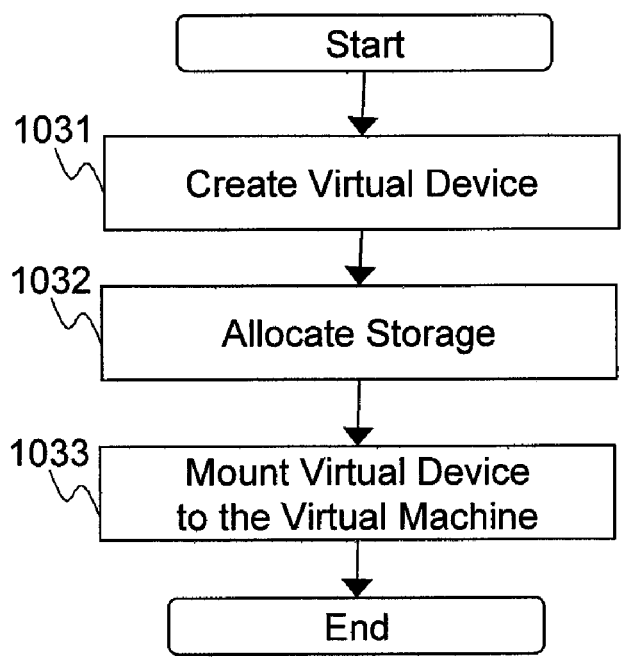
Fig. 8 Virtual Device Preparation (Option1)

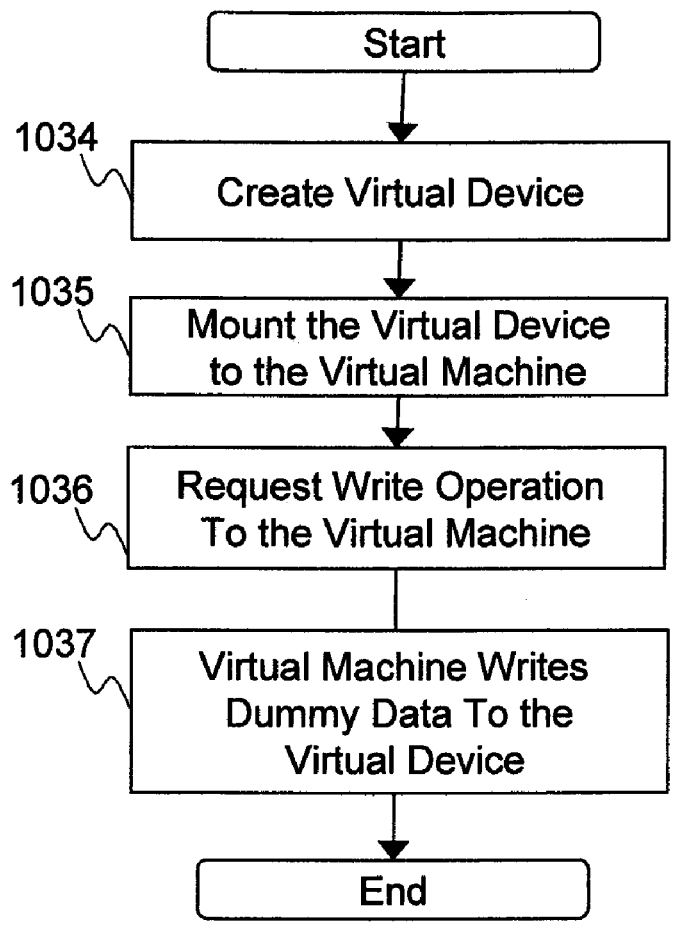
Fig. 9 Virtual Device Preparation (Option2)

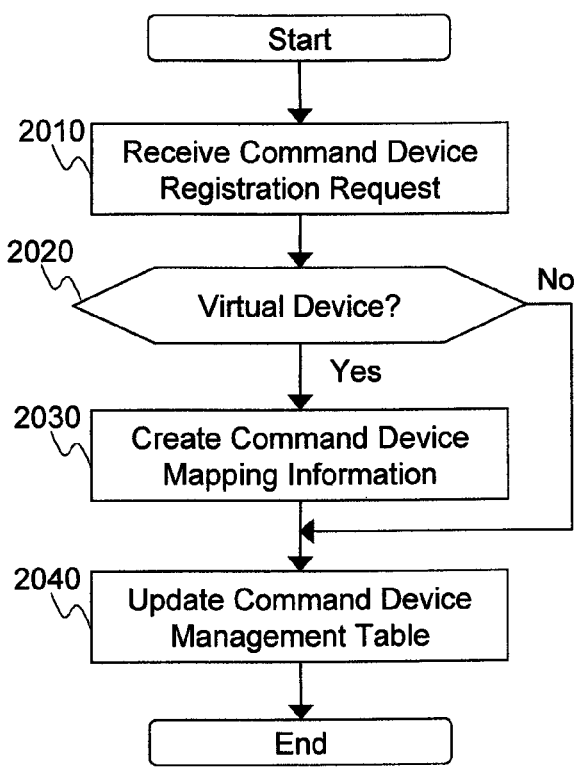
Fig. 10 Command Device Registration (Storage System)

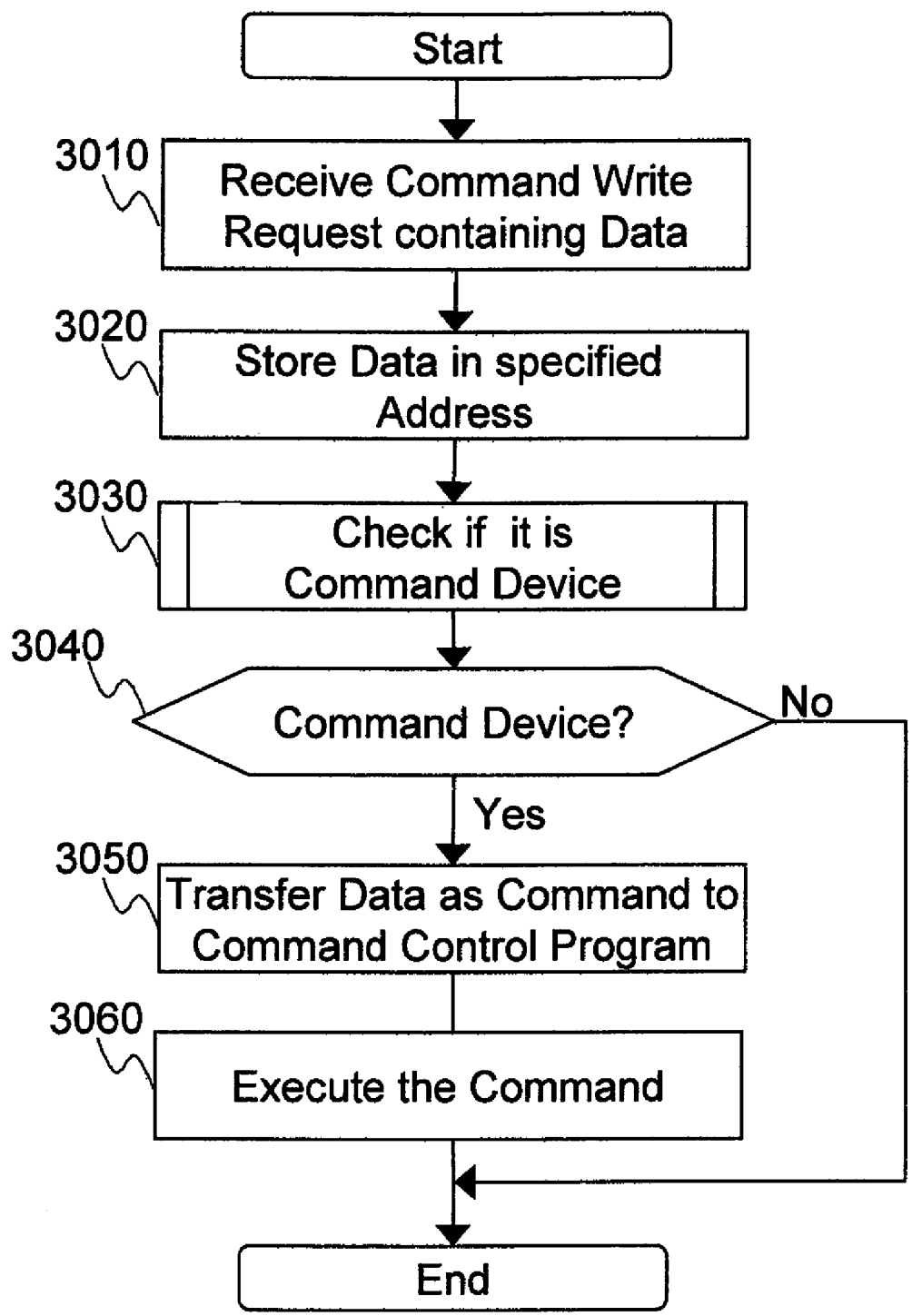
Fig. 11 Command Transfer

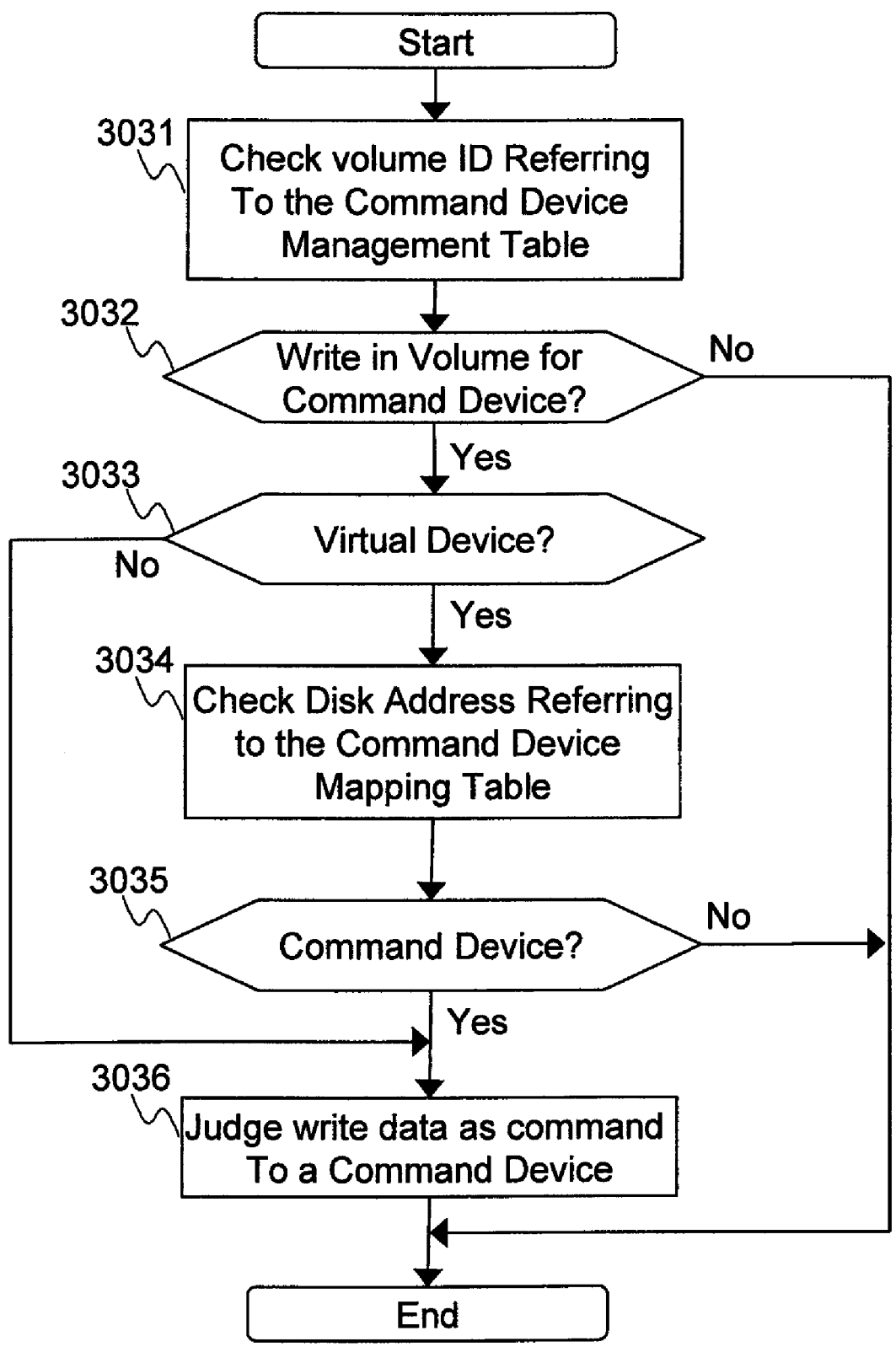
Fig. 12 Command Device Check

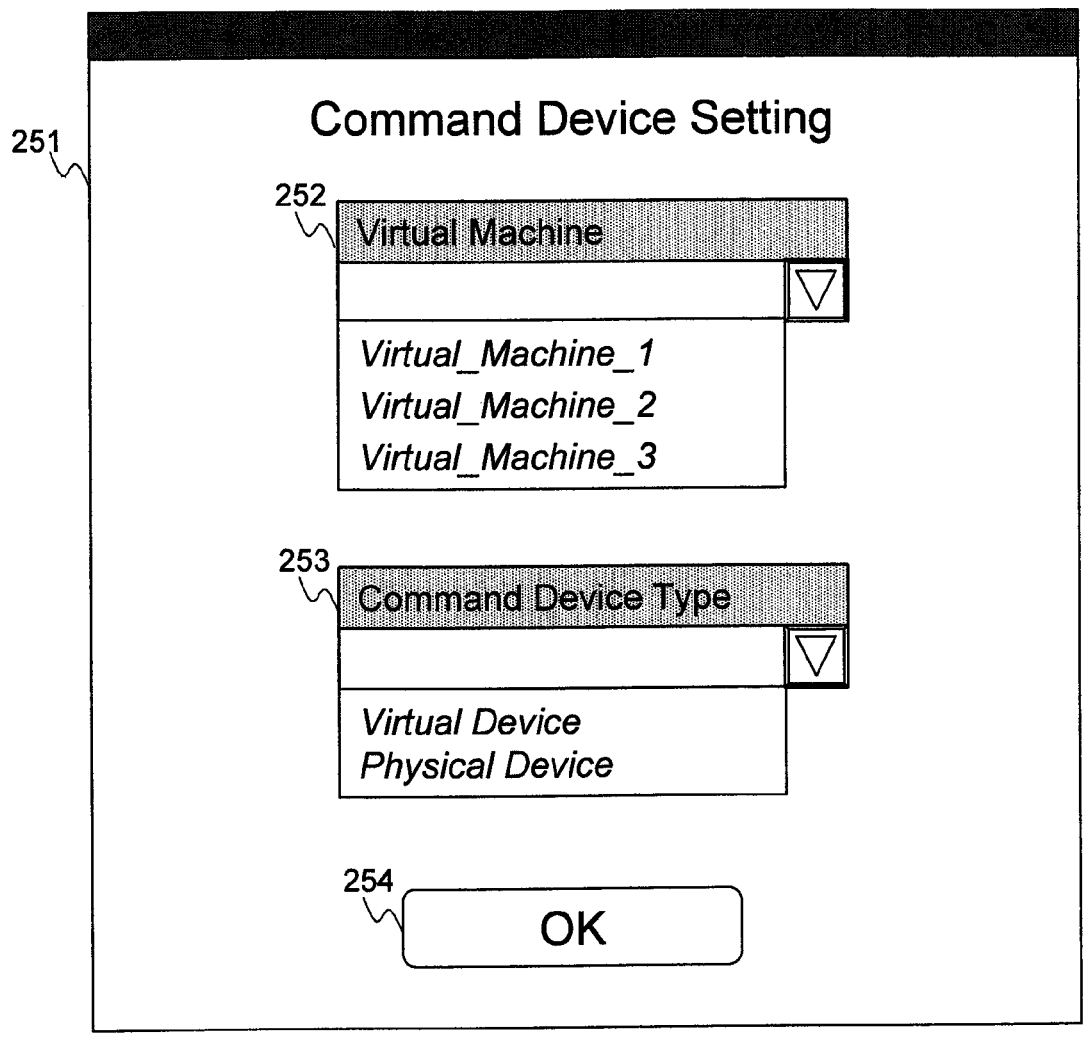
Fig. 13 Management Window

STORAGE MANAGEMENT COMMAND CONTROL IN VIRTUALIZED ENVIRONMENT

BACKGROUND OF THE INVENTION

The present invention relates generally to storage systems and, more particularly, to storage management command control in a virtualized environment.

Storage Area Network (SAN) is becoming increasingly common in IT systems of business enterprises for realizing shared storage and high-speed and reliable data transfer. The connection between the storage and a host is typically carried out through Block Storage access of SCSI (Small Computer System Interface) according to Fibre Channel or iSCSI. In the SAN environment, storage management can be conducted in either in-band or out-of-band. In-band storage management uses the same data pass as general data transfer to transmit management commands from the hosts to the storage. In contrast, out-of-band storage management uses a physically and logically separate network to transmit command to and acquire management information from the storage.

In in-band management, a management command is transferred to the storage array as well as a generic data I/O to be written in the data storage device. The storage system has a dedicated storage volume for command transmission, often called the "Command Device." The storage system treats the data written in specified storage volume as a management command.

Recently server virtualization technology is increasingly introduced into IT systems of business enterprises, and the SAN environment is considered as one of the prerequisites to construct a resilient and flexible virtualized system. Server virtualization is a technology that virtualizes a server computer by virtually splitting a set of computing resources (i.e., CPU, memory, storage, and other hardware devices) into multiple sets of computing resources so that it can run multiple operating systems and applications on one physical server. Each virtual computer running on the split resources is called a "virtual machine." Examples of commercially available server virtualization technology include VMware ESX Server, Microsoft Hyper-V, and Citlix XenServer.

The virtual machine can leverage both a virtual device and a physical device. The virtual device is stored as one or multiple sets of files which are used as a virtual hard disk for the virtual machine. Generally, not the file system on the virtual machine but the server virtualization software or file system on which the server virtualization software runs manages the actual storage device that stores virtual hard disk files. A virtual SCSI command issued form within the virtual machine is once transferred to the server virtualization software or the aforementioned file system and converted to the actual SCSI command to be sent to the storage system. Furthermore, multiple virtual machines can share one storage volume and a block-accessed storage system is generally not aware of the virtual hard disk files.

On the other hand, the physical device is used directly by the virtual machine. In this case, the physical disk/volume is assigned and mounted to the virtual machine as a storage device for the virtual machine and it is not interposed by other file systems. Therefore, a SCSI command issued from within the virtual machine is transferred almost directly to the storage without conversion.

In the existing technology, in-band storage management requires that the physical device be mounted to the virtual machine when managing storage from the virtual machine because the storage needs to be aware which volume is the command device. If it is a virtual device, block-accessed storage system is not able to recognize that a management command is written. Consequently, the number of storage volumes to be managed increases because of the storage system management constraint, whereas virtualization technology enables resource consolidation that simplifies the system management process.

BRIEF SUMMARY OF THE INVENTION

Exemplary embodiments of the invention provide a computer system and a method in which a storage system acquires block address information that comprises address information for a virtual device (as a storage command device) from a server virtualization software or a file system on which the server virtualization software runs, creates mapping information for the block address, and treats the storage blocks as a command device. Utilizing this invention, a block-access storage system can be controlled with in-band storage management command even in a server virtualization environment without a dedicated physical device. This invention enables in-band storage management operation from within the virtual machine with virtualization-standard virtual device, eliminating the need to add a physical device dedicated to the virtual machine only for storage management.

An aspect of the present invention is directed to a method for creating a command device in a storage system in a server virtualization environment. The storage system is coupled to a host computer having a virtual machine. The host computer includes a memory and a processor. The method comprises receiving a command device registration request to register a command device as a storage device for command transmission, the command device to be used in a virtual machine of the host computer; creating a virtual device by allocating a storage area of the storage system to the virtual device; and mounting the virtual device as the command device to the virtual machine in which the command device is used.

In some embodiments, the method further comprises sending to the storage system the command device registration request and address information of the storage area which is allocated to the virtual device. The method further comprises receiving the command device registration request from the host computer; and creating command device mapping information, which includes information to identify the command device, information to identify a type of the command device, information to identify command device volume of the command device, and address information of the virtual device. The method further comprises receiving, by the host computer, a write request command specifying an address of the storage area and containing write data; checking whether the write request command is directed to the command device; and if the write request command is directed to the command device, executing the write data in the write request command as a command. The checking of whether the write request command is directed to the command device comprises checking whether the address of the storage area matches any of the command device volume in the command device mapping information; checking whether the command device is a virtual device with reference to the command device mapping information; if the command device is a virtual device, checking if the address of storage area matches an address registered as the command device in the command device mapping information; and if the address of the storage area matches the address registered as the command device, judging the write data in the write request command as being a command directed to the command device.

In specific embodiments, the method further comprises checking whether the command device registration request contains a request to create a physical device or a virtual device used for a command device. The method further comprises, if the command device registration request contains a request to create a physical device: sending the command device registration request to the storage system; creating a physical device by allocating a logical volume to the physical device; and mounting a physical device as a command device to a virtual machine in which the command device is used. The method further comprises requesting the virtual machine to execute a write operation to the virtual device; and in response to the request, writing dummy data to the virtual device. The storage area comprises one or multiple storage blocks within a logical volume in the storage system.

Another aspect of the invention is directed to a system including a host computer coupled to a storage system for creating a command device in a server virtualization environment. The host computer comprises a processor, a memory, and one or more virtual machines. The memory includes a virtualization module and an operating system, one of which is configured to process a command device registration request to register a command device as a storage device for command transmission, the command device to be used in a virtual machine of the host computer. The virtualization module is configured to prepare a virtual device by allocating a storage area from a logical volume of the storage system to the virtual device, and mount the virtual device as the command device to the virtual machine in which the command device is used.

In some embodiments, the memory includes a command device registration module configured to send to the storage system the command device registration request and address information of the storage area which is allocated to the virtual device. An output device has a management window which comprises a first area whereby the one or more virtual machines in which the command device is used is selected and a second area whereby a type of command device is selected. Selection of the type of command device comprises selection of a virtual device and a physical device. The physical device comprises one or more logical volumes of the storage system, dedicated for use as the command device.

In accordance with another aspect of the invention, the storage system comprises a processor, a memory, and one or more logical volumes. The memory includes a command device management module configured to process a command device registration request to register a command device as a storage device for command transmission, the command device to be used in a virtual machine of the host computer. A virtual device is created by allocating a storage area of the storage system to the virtual device, and is to be mounted as the command device.

These and other features and advantages of the present invention will become apparent to those of ordinary skill in the art in view of the following detailed description of the specific embodiments.

BRIEF DESCRIPTION OF THE DRAWINGS

FIG. 3 shows an example of the command device management table.

FIG. 4 shows an example of the command device mapping table.

FIG. 7 shows an example of a process flow diagram for command device registration in the host computer.

FIG. 8 shows one example of a process flow diagram for virtual device preparation in the host computer.

FIG. 9 shows another example of a process flow diagram for virtual device preparation in the host computer.

FIG. 10 shows an example of a process flow diagram for command device registration in the storage system.

FIG. 11 shows an example of a process flow diagram for command transfer via the command device.

FIG. 12 shows an example of a process flow diagram for command device check in FIG. 11.

FIG. 13 shows an example of a management window to be displayed in the output device of the host computer.

DETAILED DESCRIPTION OF THE INVENTION

Figure 1:
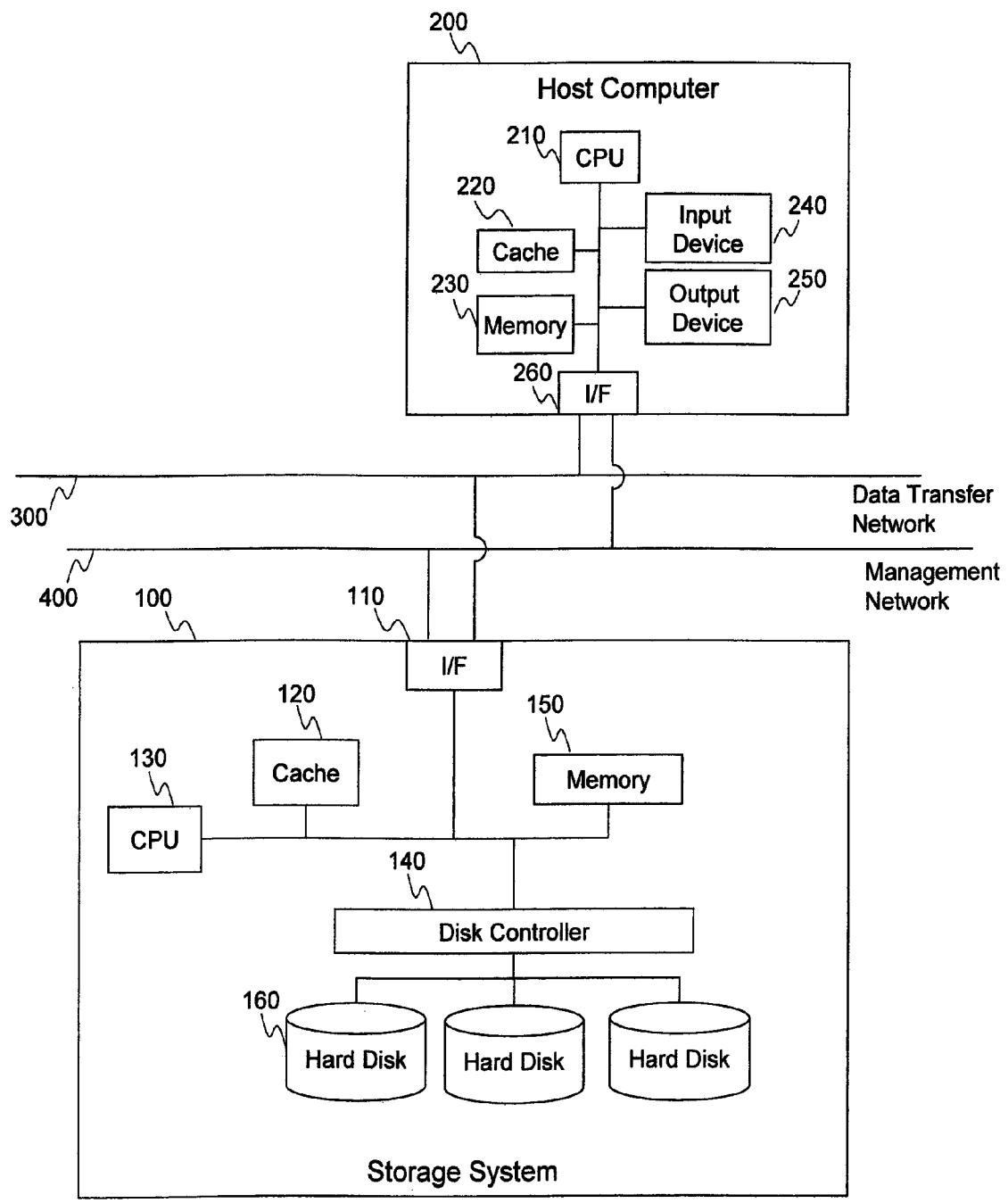
FIG. 1 illustrates an example of a hardware configuration of a computer system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for enabling in-band storage management operation from within the virtual machine with virtualization-standard virtual device, eliminating a need to add physical device dedicated to the virtual machine only for storage management. Utilizing this invention, a block-access storage system can be controlled with in-band storage management command even in a server virtualization environment without a dedicated physical device. The embodiments provide a computer system and a method in which either a physical device or a virtual device can be used as command device from within the virtual machine. Utilizing this invention, an administrator is not forced to use a physical volume as a command device.

1. System Structure

FIG. 1 illustrates an example of a hardware configuration of a computer system in which the method and apparatus of the invention may be applied. The computer system includes a storage system 100 and a physical host computer 200 which are connected via a data transfer network 300 and a management network 400.

The storage system 100 includes an interface 110, a cache 120, a CPU 130, a disk controller 140, a memory 150, and hard disks 160. The interface 110 is used to transfer data to/from the data transfer network 300, and it typically includes an Ethernet network interface and a FC network interface. The cache 120 is used as temporary data storage. The memory 150 stores programs and tables read by the CPU 130. The CPU 130 calls the programs and tables stored in the memory 150, and executes the programs. In this disclosure, programs are always executed by CPU. The disk controller 140 controls associated hard disks 160. There may be one or a plurality of hard disks 160 in the storage system 100. A plurality of hard disks 160 can configure the RAID configuration for its redundancy. A group of hard disks for a single RAID configuration is called a "parity group." These groups of hard disks are used as logically separate volumes referred to as "logical volumes."

The computer system in FIG. 1 includes one or more physical host computers 200. The host computer 200 hosts operating system, server virtualization program, and virtual machines. The host computer 200 can be a generic computer that is at least comprised of a CPU 210, a cache 220, a memory 230, an input device 240, an output device 250, and an interface 260. These components may be the same as those found in generic computers. The CPU 210 controls the host computer 200. The cache 220 stores data temporarily. The memory 230 stores programs and tables read and used by the CPU 210 to manage the host computer 200. The input device 240 can be any generic input device such as a keyboard and a mouse. The output device 250 can be any generic output device such as an LCD. The interface 260 is used to transmit data from/to the networks. It typically includes an Ethernet network interface and a FC network interface.

The data transfer network 300 is used to transfer data between the physical host computer 200 and the storage system 100. For example, transaction data created by users on the host computer 200 are transferred via the data transfer network 300 to the storage system 100 and stored in the hard disks 160. This network can be either a FC SAN or an IP SAN.

The management network 400 is used to transfer management information between the host computer 200 and the storage system 100. This network can be an IP network, and also can be a shared network with the data transfer network 300.

Figure 2:
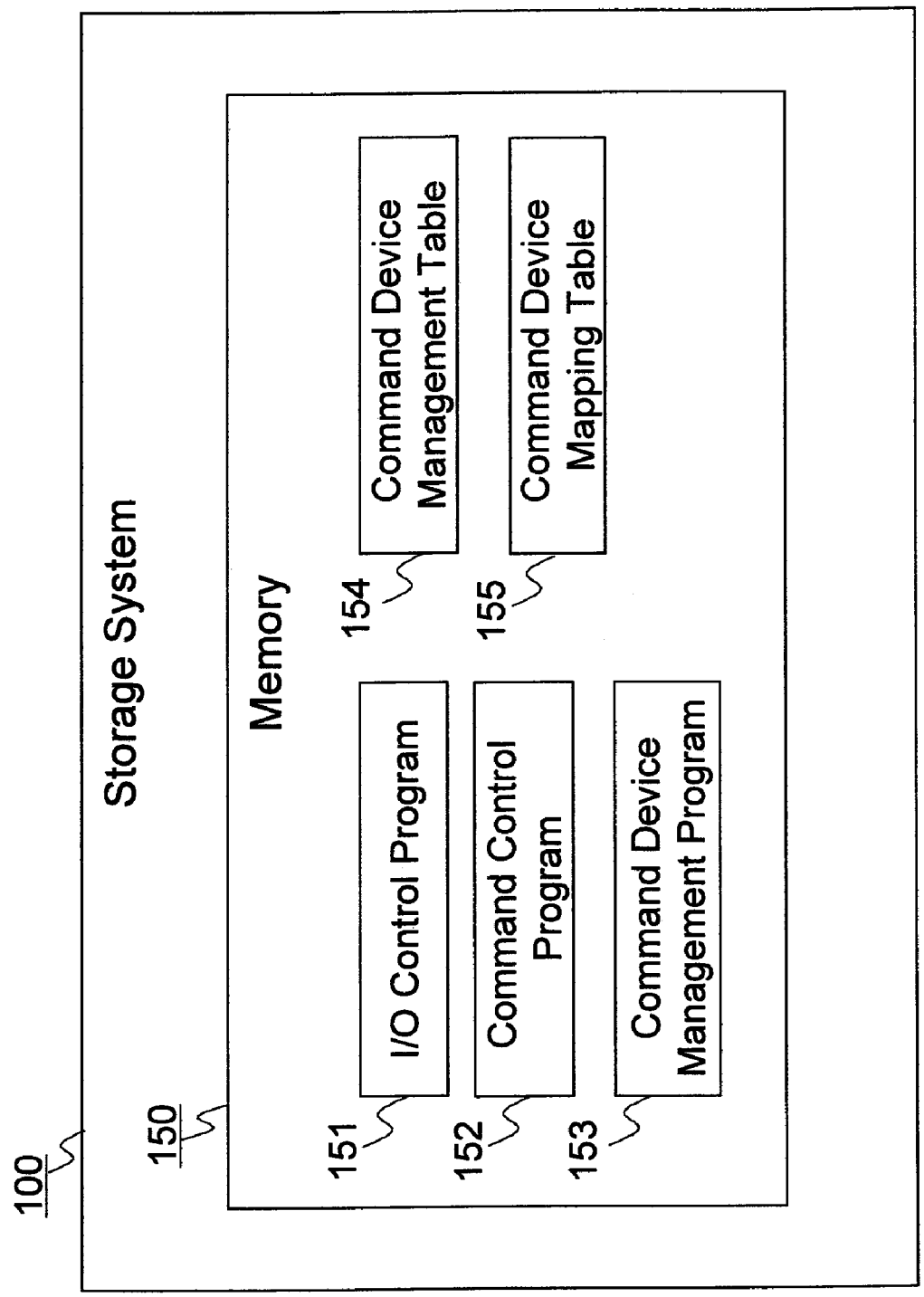
FIG. 2 shows an example of the programs and tables stored in the memory of storage system.

FIG. 2 shows an example of the programs and tables stored in the memory 150 of the storage system 100. An I/O control program 151 is for I/O control in the storage system 100. A command control program 152 receives and executes commands. A command device mapping program 153 acquires block address information for the virtual hard disk from the file system being run in the host computer 200, and creates mapping information by updating a command device management table 154 and a command device mapping table 155. The command device management table 154 contains command device information registered in the storage system 100. The volume registered in this table is used as a command device that stores SCSI command issued by the host computer 200 and to be read and executed by the command control program 152. The command device mapping table 155 contains mapping information of virtual hard disk and command device.

FIG. 3 shows an example of the command device management table 154. It contains at least information for command device ID, volume ID, and device type. Command devices are registered and managed with this table. The command device ID is information to identify the command device. The volume ID is information to identify the volume. The device type is information to specify whether the command device is "Physical Device" or "Virtual Device." For "Physical Device," the command device is used as a physical volume by being mounted directly to the host computer or virtual machine. For "Virtual Device," the command device is used as a virtual hard disk from within the virtual machine. The virtual hard disk is stored as one or multiple files. Therefore, it consumes or occupies partial storage area of the volume.

FIG. 4 shows an example of the command device mapping table 155. It contains at least information for command device ID 1551, volume ID 1552, and disk address 1552. The command device ID is information to identify the command device. This table contains only "Virtual" command devices. The volume ID 1552 is information to specify the storage volume for the command device. The disk address 1553 is information to specify the disk block address such as LBA for a virtual command device. It can also contain information to specify the disk number or disk drive depending on the system configuration.

Figure 5:
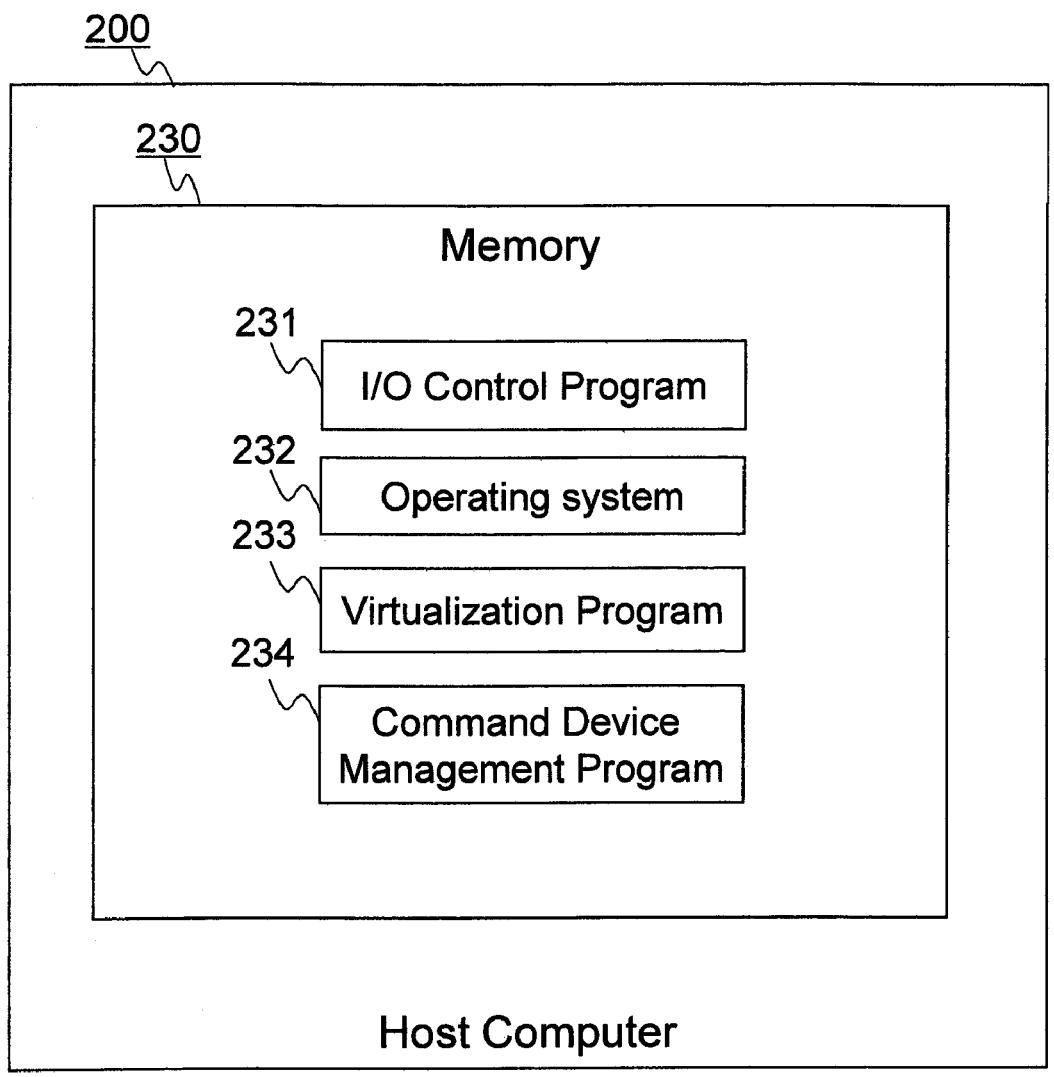
FIG. 5 shows an example of the programs and tables stored in the memory of the host computer.

FIG. 5 shows an example of the programs and tables stored in the memory 230 of the physical host computer 200. The memory 230 stores at least an I/O control program 231, an operating system 232, a virtualization program 233, and a command device management program 234. The I/O control program 231 is for I/O control in the host computer 200. The operating system 232 may be a general operating system software. The virtualization program 233 has one or more applications to be executed on the host computer 200. The command device management program 234 enables administrators to manage the command device from either the operating system 232 or within the virtual machine. The management operations include registering a command device as either a physical device or a virtual device.

Figure 6:
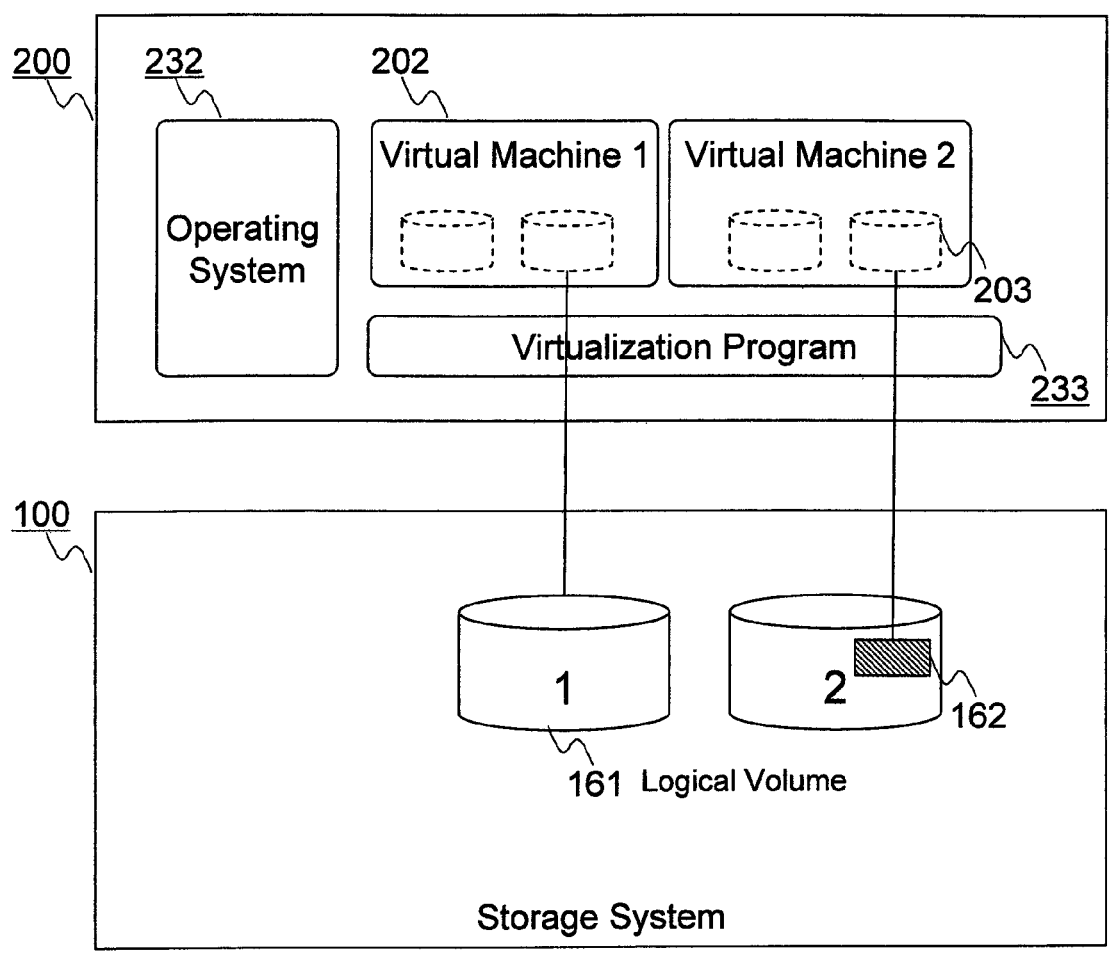
FIG. 6 shows a logical view of the storage configuration of the computer system of FIG. 1 to illustrate the "Physical Device" and "Virtual Device" according to an embodiment of this invention.

FIG. 6 shows a logical view of the storage configuration of the computer system of FIG. 1 to illustrate the "Physical Device" and "Virtual Device" according to an embodiment of this invention. A barrel-shaped object in the storage system 100 indicates a logical storage volume 161 that consists of one or multiple hard disks 160. A hashed square indicates a storage area used as a virtual device (i.e., virtual hard disk). The logical volume 2 mounted to the virtual machine 1 is used as a dedicated physical device by the virtual machine 1 while the virtual hard disk 162 stored in logical volume 2 is used as a virtual device by the virtual machine 2. Note that the logical volume 2 can be shared with multiple virtual hard disks as long as its capacity allows. If the logical volume 1 is to be a command device, the storage system 100 only needs to register the volume as a command device and treat written data as a command. On the other hand, if the virtual device 162 in the logical volume 2 is to be a command device, it is required that the command device mapping program 153 creates mapping information for the command device and block address within the logical volume 2.

2. Process Flows

FIG. 7 shows an example of a process flow diagram for command device registration in the host computer 200. This process flow assumes that the command device registration program runs on the operating system 232 or the virtualization program 233 (not on the virtual machine) on the host computer 200 of FIG. 5. In step 1010, the command device registration program receives a command device registration request from an administrator. If the command device is virtual device (Yes in step 1020), the server virtualization program 233 prepares the virtual device (i.e., virtual hard disk file) in step 1030. The details of this step are described below in connection with FIG. 8. Finally, the command device registration program sends a command device registration request and disk address information which includes address information for the virtual device to the storage system 100 in step 1040. If the command device is a physical disk (No in step 1020), the command device registration program sends a command device registration request to the storage system 100 in step 1050, and mounts the physical device to the virtual machine in which the command device is used in step 1060.

FIG. 8 shows one example of a process flow diagram for virtual device preparation in the host computer 200 (step 1030 in FIG. 7). The server virtualization program 233 creates a virtual device (i.e., virtual hard disk) in step 1031. In step 1032, the server virtualization program 233 allocates storage area to the virtual device so that storage blocks are assigned and fixed to the virtual device. In a practical case, a server virtualization program such as Microsoft Hyper-V and VMware ESX Server can allocate storage area when it creates a virtual hard disk file by specifying thick-provisioning rather than thin-provisioning. In step 1033, the server virtualization program 233 mounts the created virtual device to the virtual machine in which the command device is used.

FIG. 9 shows another example of a process flow diagram for virtual device preparation in the host computer 200. This process write operation forms the virtual machine to allocate physical storage area to the virtual device. The server virtualization program 233 creates the virtual device (i.e., virtual hard disk) in step 1034. The server virtualization program 233 mounts the created virtual device to the virtual machine in which the command device is used in step 1035. In step 1036, the server virtualization program 233 requests the virtual machine to execute the write operation to the virtual device in order to allocate/fix physical storage area for the virtual device. Upon receiving the request, the virtual machine writes dummy data to the virtual device in step 1037. The dummy data can be a meaningless sequence of numeric values created in the virtual machine.

FIG. 10 shows an example of a process flow diagram for command device registration in the storage system 100. The storage system 100 receives a command device registration request in step 2010. If the command device registration request is for the virtual device (Yes in step 2020), the command device management program 153 creates command device mapping information by updating the command device mapping table 155 in step 2030. If the command device registration request is for the physical device (No in step 2020), the command device management program 153 updates the command device management table 154 in step 2040.

FIG. 11 shows an example of a process flow diagram for command transfer via the command device. The storage system 100 receives a command write request in step 3010. The I/O control program 151 stores the data in specified address in step 3020. The command device management program 153 checks if the command write request is directed to a command device or not in step 3030. The checking process is described below in connection with FIG. 12. If it is a command device (Yes in step 3040), the command device management program 153 transfers the write data as a command to the command control program 152 in step 3050. Then the command control program 152 executes the transferred command in step 3060. In actual implementation, steps 3020 and 3030 can be executed in parallel or data can be checked when it is in cache 120 to accelerate the process. If the command write request is not directed to a command device, the process ends.

FIG. 12 shows an example of a process flow diagram for command device check to check if a command write request is directed to a command device or not in the step 3030 of FIG. 11. In step 3031, the command device management program 153 checks if the volume ID of the write request matches the volume ID registered in the command device management table 154. If it is not a write request to a command device (No in step 3032), the process ends. If it is a write request to one of the command devices (Yes in step 3032), the command device management program 153 further checks if it is a virtual device in step 3033 by referring to the same table 154. If the command device is a virtual device (Yes in step 3033), then the command device management program 153 checks if the disk address matches the disk address registered as a command device (virtual disk) by referring to the command device mapping table 155 in step 3034. If the disk address matches the command device disk address (Yes in step 3035), or if the command device is not a virtual device (No in step 3033), then the command device management program 153 judges the write I/O as a write I/O to the command device (i.e., treats the written data as a command) in step 3036. If the disk address does not match the command device disk address (No in step 3035), the process ends.

3. Management Window

FIG. 13 shows an example of a management window to be displayed in the output device 250 of the host computer 200 to enable an administrator to input request specifying which command device type and for which virtual machine. The management window 251 has an area 252 that shows a selection of virtual machines in which the command device is used, an area 253 that shows a selection of command device type, and a confirmation button 254.

Of course, the system configurations illustrated in FIGS. 1, 2, and 6 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for enabling in-band storage management operation from within the virtual machine with virtualization-standard virtual device. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method for creating a command device in a storage system in a server virtualization environment, the storage system being coupled to a host computer having a virtual machine, the host computer including a memory and a processor, the method comprising:

receiving a command device registration request to register the command device as a storage device for command transmission, the command device to be used in the virtual machine of the host computer;

creating a virtual device by allocating a storage area of the storage system to the virtual device; and mounting the virtual device as the command device to the virtual machine in which the command device is used.

2. A method according to claim 1, further comprising:

sending to the storage system the command device registration request and address information of the storage area which is allocated to the virtual device.

3. A method according to claim 1, further comprising:

receiving the command device registration request from the host computer; and creating command device mapping information, which includes information to identify the command device, information to identify a type of the command device, information to identify command device volume of the command device, and address information of the virtual device.

4. A method according to claim 3, further comprising:

receiving, by the host computer, a write request command specifying an address of the storage area and containing write data;

checking whether the write request command is directed to the command device; and if the write request command is directed to the command device, executing the write data in the write request command as a command.

5. A method according to claim 4, wherein the checking of whether the write request command is directed to the command device comprises:

checking whether the address of the storage area matches any command device volume in the command device mapping information;

checking whether the command device is a virtual device with reference to the command device mapping information;

if the command device is a virtual device, checking if the address of storage area matches an address registered as the command device in the command device mapping information; and if the address of the storage area matches the address registered as the command device, judging the write data in the write request command as being a command directed to the command device.

6. A method according to claim 1, further comprising:
checking whether the command device registration request contains a request to create a physical device or a virtual device used for a command device.

7. A method according to claim 6, further comprising, if the command device registration request contains a request to create a physical device:

sending the command device registration request to the storage system;

creating a physical device by allocating a logical volume to the physical device; and mounting a physical device as a command device to a virtual machine in which the command device corresponding to the physical device is used.

8. A method according to claim 1, further comprising:
requesting the virtual machine to execute a write operation to the virtual device; and in response to the request to execute the write operation, writing dummy data to the virtual device.

9. A method according to claim 1, wherein the storage area comprises one or multiple storage blocks within a logical volume in the storage system.

10. A system including a host computer coupled to a storage system for creating a command device in a server virtualization environment, the host computer comprising:

a processor, a memory, and one or more virtual machines;

wherein the memory includes a virtualization module and an operating system, one of which is configured to process a command device registration request to register the command device as a storage device for command transmission, the command device to be used in a virtual machine of the host computer; and wherein the virtualization module is configured to prepare a virtual device by allocating a storage area from a logical volume of the storage system to the virtual device, and mount the virtual device as the command device to the virtual machine in which the command device is used.

11. The system according to claim 10,
wherein the memory includes a command device registration module configured to send to the storage system the command device registration request and address information of the storage area which is allocated to the virtual device.

12. The system according to claim 10,
wherein the memory includes a command device registration module configured to check whether the command device registration request contains a request to create a physical device or a virtual device used for a command device.

13. The system according to claim 12, wherein, if the command device registration request contains a request to create a physical device, the command device registration module:

sends the command device registration request to the storage system wherein the physical device is created by allocating a logical volume to the physical device; and mounts the physical device as a command device to a virtual machine in which the command device corresponding to the physical device is used.

14. The system according to claim 10,
wherein the virtualization module is configured to request the virtual machine in which the command device is used to execute a write operation to the virtual device; and wherein the virtual machine in which the command device is used, in response to the request to execute the write operation, writes dummy data to the virtual device.

15. The system according to claim 10, further comprising:
an output device having a management window which comprises a first area whereby the virtual machine in which the command device is used is selected and a second area whereby a type of command device is selected.

16. The system according to claim 15,
wherein selection of the type of command device comprises selection of a virtual device and a physical device, and wherein the physical device comprises one or more logical volumes of the storage system, dedicated for use as the command device.

17. A system including a host computer coupled to a storage system for creating a command device in a server virtualization environment, the storage system comprising:

a processor, a memory, and one or more logical volumes;

wherein the memory includes a command device management module configured to process a command device registration request to register the command device as a storage device for command transmission, the command device to be used in a virtual machine of the host computer; and wherein a virtual device is created by allocating a storage area of the storage system to the virtual device, and is to be mounted as the command device.

18. The system according to claim 17,
wherein the memory includes an I/O control module to receive a write request command specifying an address of the storage area and containing write data;

wherein the command device management module is configured to check whether the write request command is directed to the command device; and wherein if the write request command is directed to the command device, the command device management module transfers the write data in the write request command to a command control program in the memory to be executed as a command.

19. The system according to claim 18,
wherein the command device management module processes the command device registration request by creating command device mapping information, which includes information to identify the command device, information to identify a type of the command device, information to identify command device volume of the command device, and address information of the virtual device.

20. The system according to claim 19, wherein to check whether the write request command is directed to the command device, the command device management module:

checks whether the address of the storage area matches any command device volume in the command device mapping information;

checks whether the command device is a virtual device with reference to the command device mapping information;

if the command device is a virtual device, checks if the address of storage area matches an address registered as the command device in the command device mapping information; and if the address of the storage area matches the address registered as the command device, judges the write data in the write request command as being a command directed to the command device.

* * * * *